(12) United States Patent
Coy

(10) Patent No.: US 7,823,904 B2
(45) Date of Patent: Nov. 2, 2010

(54) HITCH BAR ASSEMBLY

(76) Inventor: Thomas Coy, 621 Allen Ave., Glendale, CA (US) 91201

( * ) Notice: Subject to any disclaimer, the term of this patent is extended or adjusted under 35 U.S.C. 154(b) by 461 days.

(21) Appl. No.: 11/936,151

(22) Filed: Nov. 7, 2007

(65) Prior Publication Data

US 2009/0115165 A1    May 7, 2009

(51) Int. Cl.
*B60D 1/24* (2006.01)
(52) U.S. Cl. .................. 280/506; 280/504; 280/505; 280/507
(58) Field of Classification Search .......... 280/504–507
See application file for complete search history.

(56) References Cited

U.S. PATENT DOCUMENTS

| | | | |
|---|---|---|---|
| 3,630,321 A | 12/1971 | Hollnagel | |
| 3,990,722 A | 11/1976 | Casad et al. | |
| 4,050,714 A * | 9/1977 | Epp | 280/495 |
| 4,746,138 A | 5/1988 | James | |
| 5,000,067 A | 3/1991 | Kolbusz et al. | |
| 5,333,888 A | 8/1994 | Ball | |
| 5,593,172 A * | 1/1997 | Breslin | 280/506 |
| 5,988,667 A * | 11/1999 | Young | 280/506 |
| 6,105,989 A * | 8/2000 | Linger | 280/506 |
| 6,142,502 A * | 11/2000 | Breslin | 280/506 |
| 6,598,897 B1 * | 7/2003 | Patti | 280/507 |
| 6,733,029 B2 | 5/2004 | McCoy et al. | |
| 7,467,804 B2 * | 12/2008 | Ezra | 280/506 |

\* cited by examiner

*Primary Examiner*—Lesley Morris
*Assistant Examiner*—Michael R Stabley
(74) *Attorney, Agent, or Firm*—Tsircou Law, P.C.

(57) ABSTRACT

A hitch assembly is provided having a hitch shank configured to be received within an opening of a hitch receiver of a tow vehicle and a wedge member disposed about the hitch shank. The wedge member has first and second surfaces on opposing sides of the wedge member, angled relative to one another. An engagement device is coupled to the wedge member to press the wedge member to an engaged position that causes the hitch shank to bias away from the receiver tube to minimize play therebetween.

19 Claims, 3 Drawing Sheets

HITCH BAR ASSEMBLY

FIELD OF THE INVENTION

The present invention relates generally to hitch bars and, more particularly, to hitch bar assemblies configured for secure mounting to a hitch receiver box.

BACKGROUND OF THE INVENTION

Hitch assemblies have long been used to provide a mechanism for attaching a trailer to a tow vehicle. Typically, a tow vehicle includes a tow ball at the rear of the vehicle and the trailer includes a coupling device that attaches atop the tow ball. More particularly, the tow ball typically is secured to a hitch bar, or draw bar, that extends rearward from the rear of the vehicle. Such hitch bars include a shank that extends axially into a hitch receiver of the tow vehicle. With the shank fully inserted, apertures of the shank and the hitch receiver align with one another. A locking pin extends through the apertures of the hitch bar and the hitch receiver to secure the components together.

The locking pin and corresponding apertures are sized to enable users to manually assemble the components together, which can result in relatively substantial play between the hitch bar and the hitch receiver. During use, the hitch assembly transfers loads between the tow vehicle and the trailer. Play among the components hitch assembly can create in increased stress on the components, resulting in structural damage. Moreover, play between the components of the hitch can exacerbate the transfer of loads between the trailer and the tow vehicle, which can adversely impact control over the tow vehicle and the trailer.

It should, therefore, be appreciated that there remains a need for a hitch assembly that addresses the aforementioned shortcomings. The present invention fulfills this need and others.

SUMMARY OF THE INVENTION

In general terms, the present invention provides a hitch bar assembly having a hitch shank configured to be received within an opening of a hitch receiver of a tow vehicle and a wedge member disposed about the hitch shank. The wedge member has first and second surfaces on opposing sides of the wedge member, angled relative to one another. An engagement device is coupled to the wedge member to press the wedge member to an engaged position that causes the hitch shank to bias away from the receiver tube to minimize play therebetween.

More particularly, and in an exemplary embodiment, the hitch bar assembly includes a support surface coupled to the hitch shank that is spaced apart from and facing an end surface of the receiver tube disposed about the opening thereof. The second surface of the wedge member is configured to engage the support surface when in the engaged position. For example, the support surface can be provided by one or more support blocks mounted to the hitch shank.

In a detailed aspect of an exemplary embodiment, the engagement device attaches the wedge member to the hitch shank. For example, the wedge member can define a first hole in an upper portion thereof aligned with a second hole defined by the hitch shank, such that the first and the second hole cooperate to allow the engagement device to pass through to couple the wedge member and the hitch shank together. The engagement device can further include a biasing member that bias wedge member to a disengaged position. The hitch bar assembly can also include an L-shaped ball mount attached to the hitch shank that defines a hole sized to receive a threaded shank of a tow ball.

In another detailed aspect of an exemplary embodiment, a proximal surface of the wedge member is configured to engage the end surface of the receiver tube and a distal surface configured to engage the support blocks of the hitch shank, wherein the distal surface is angled relative to the proximal surface. More particularly, the proximal surface of the wedge member is generally parallel to the end surface of the hitch receiver.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein. Moreover, a number of features are discussed throughout the specification with reference to particular embodiments. Nonetheless, those skilled in the art will appreciate that various other embodiments can be provided without departing from the scope of the invention, to include any and all combination of features discussed.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
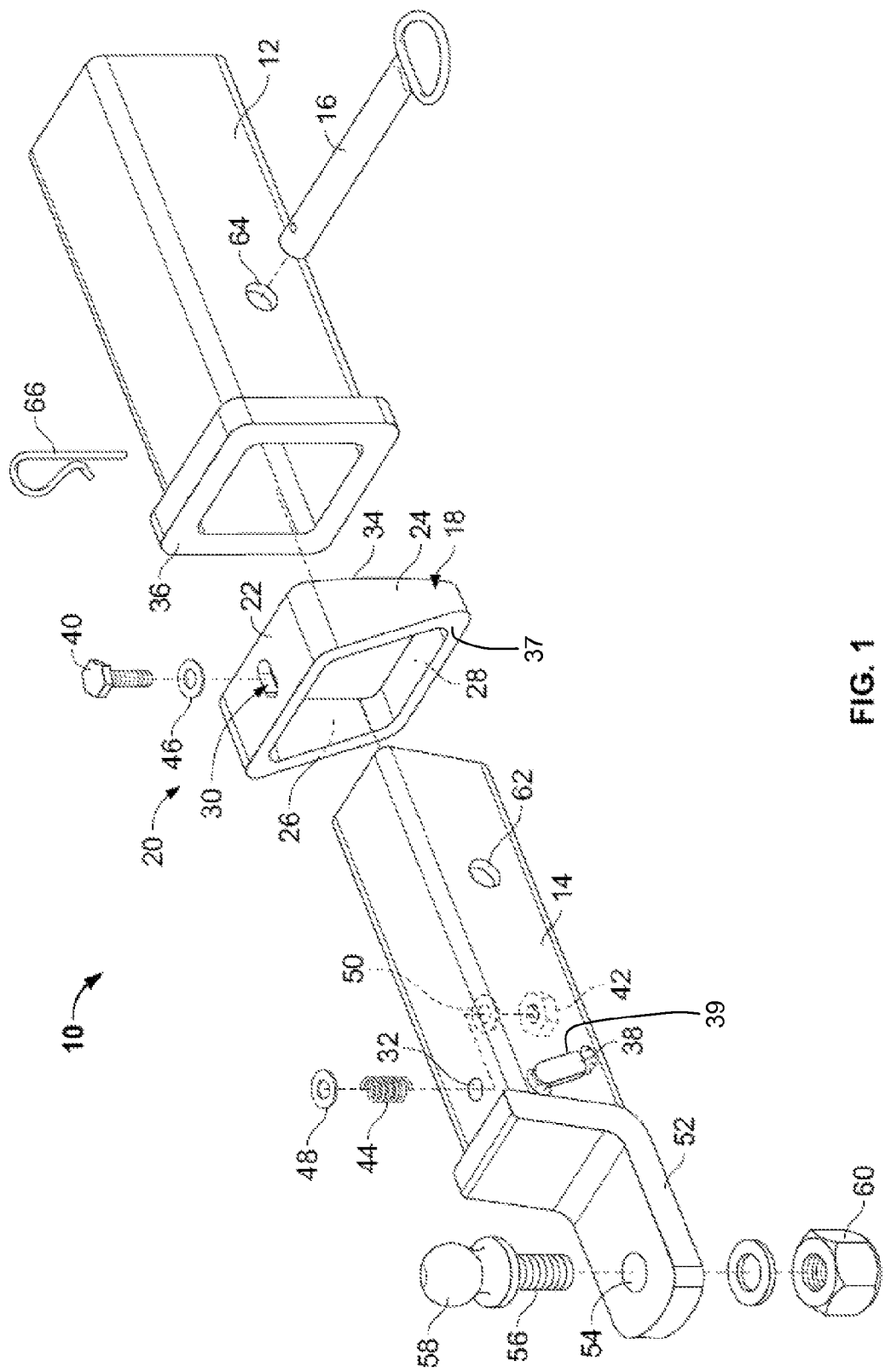
FIG. 1 is a partially exploded perspective view of a hitch bar assembly in accordance with the invention, depicting a hitch shank to be received by a hitch receiver of a tow vehicle.

Referring now to the drawings, and particularly FIG. 1, there is shown a hitch bar assembly 10 for coupling to a receiver tube 12. More particularly, the hitch bar assembly includes a hitch shank 14 that extends into the receiver tube and is attached thereto by a locking pin 16. The hitch bar assembly includes a wedge member 18 disposed about the hitch shank. An engagement device 20 is provided to press the wedge member to an engaged position (FIG. 3) to cause the hitch shank to bias away from the receiver tube to minimize play therebetween.

The wedge member 18 is generally tubular, having an upper wall 22, two side walls 24, 26 (FIG. 1) and a lower wall 28. The upper wall defines a first hole 30 aligned with a second hole 32 defined by the hitch shank, such that the first and the second hole cooperate to allow the engagement device 20 to couple the wedge member and the hitch shank together. The height of the wedge member is sized to allow vertical movement between the wedge member and the hitch shank. Whereas, the width of the wedge member closely conforms to the width of the hitch shank, minimizing horizontal movement.

The wedge member 18 defines a proximal surface 34 that engages an end surface 36 of the receiver tube 12. In the exemplary embodiment, the proximal surface is configured to be generally parallel to the end surface, when in use. In other embodiments, the proximal surface can be configured to engage other structure, e.g., intervening structure disposed between the wedge member and the receiver tube, so long as the wedge member can bias the hitch shank away from the receiver tube in the engaged position to minimize play therebetween.

Figure 3:
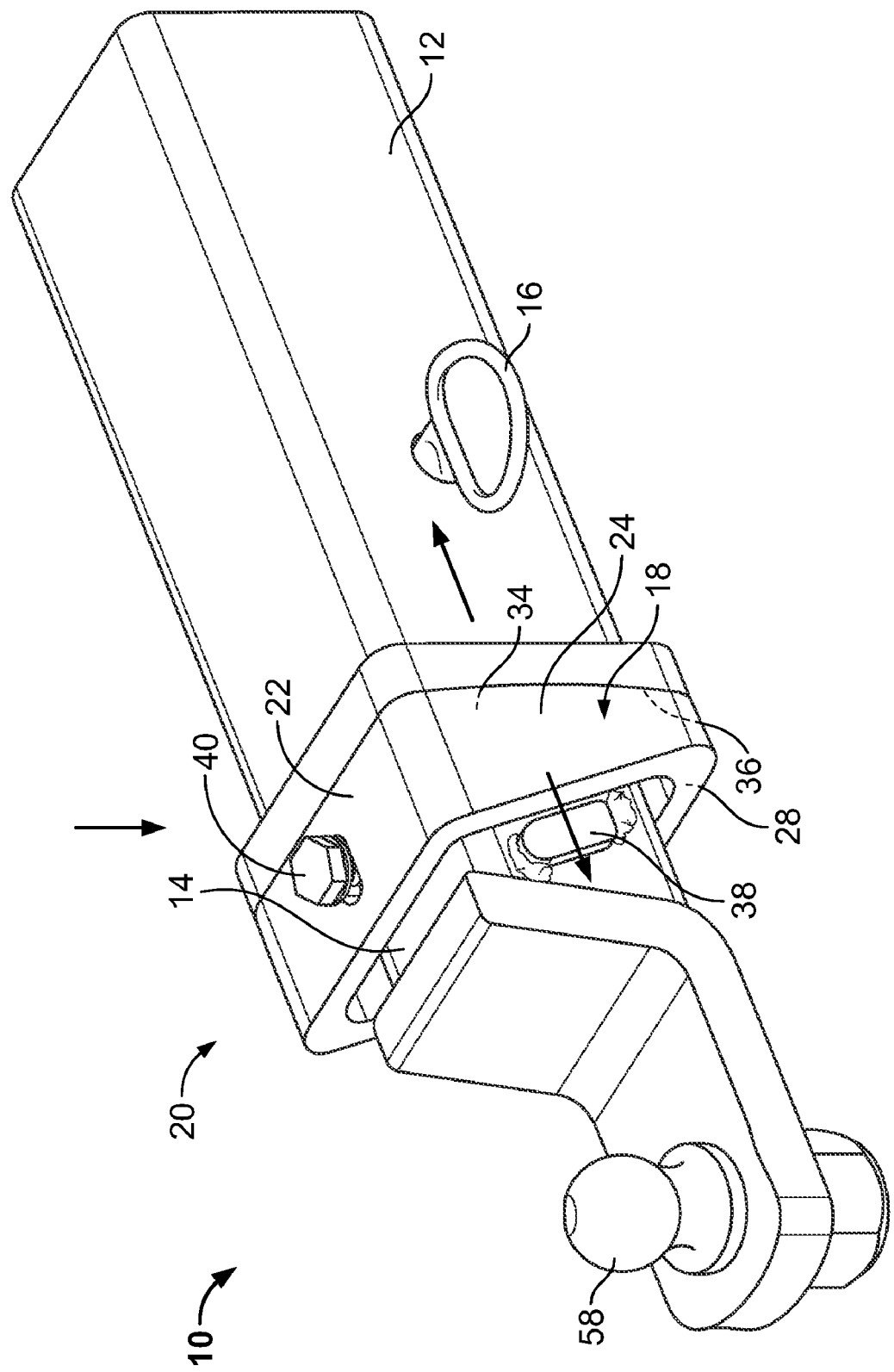
FIG. 3 is a perspective view of the hitch bar assembly of FIG. 1, depicting a wedge member in an engaged position pressing against a support surface of the hitch shank and an end surface of the hitch receiver.

The wedge member 18 further defines a distal surface 37 on an opposing side of the wedge member relative to the proximal surface 34. The distal surface 37 is angled relative to the proximal surface. Each support block 38 provides a support surface 39 that contacts the distal surface 37 of the wedge member, in the engaged position (FIG. 3). The support blocks 38 are disposed on opposing sides of the hitch shank 14 and are spaced from and angled relative to the end surface 36 of the receiver tube 12. However, the support blocks are sufficiently close to the receiver tube, such that with the wedge member in the engaged position (FIG. 3) the hitch shank is biased away from the receiver tube to minimize play therebetween.

In the exemplary embodiment, the distal surface 36 is configured to engage support blocks 38 attached to the hitch shank 14. In other embodiments, the support surface can be provided by various other components of the hitch bar assembly, so long as the wedge member, in the engaged position, can impart force thereto to bias the hitch shank away from the receiver tube to minimize play therebetween. With the wedge member in the engaged position, the locking pin 16 is bears some force, which can keep it secured in place.

Figure 2:
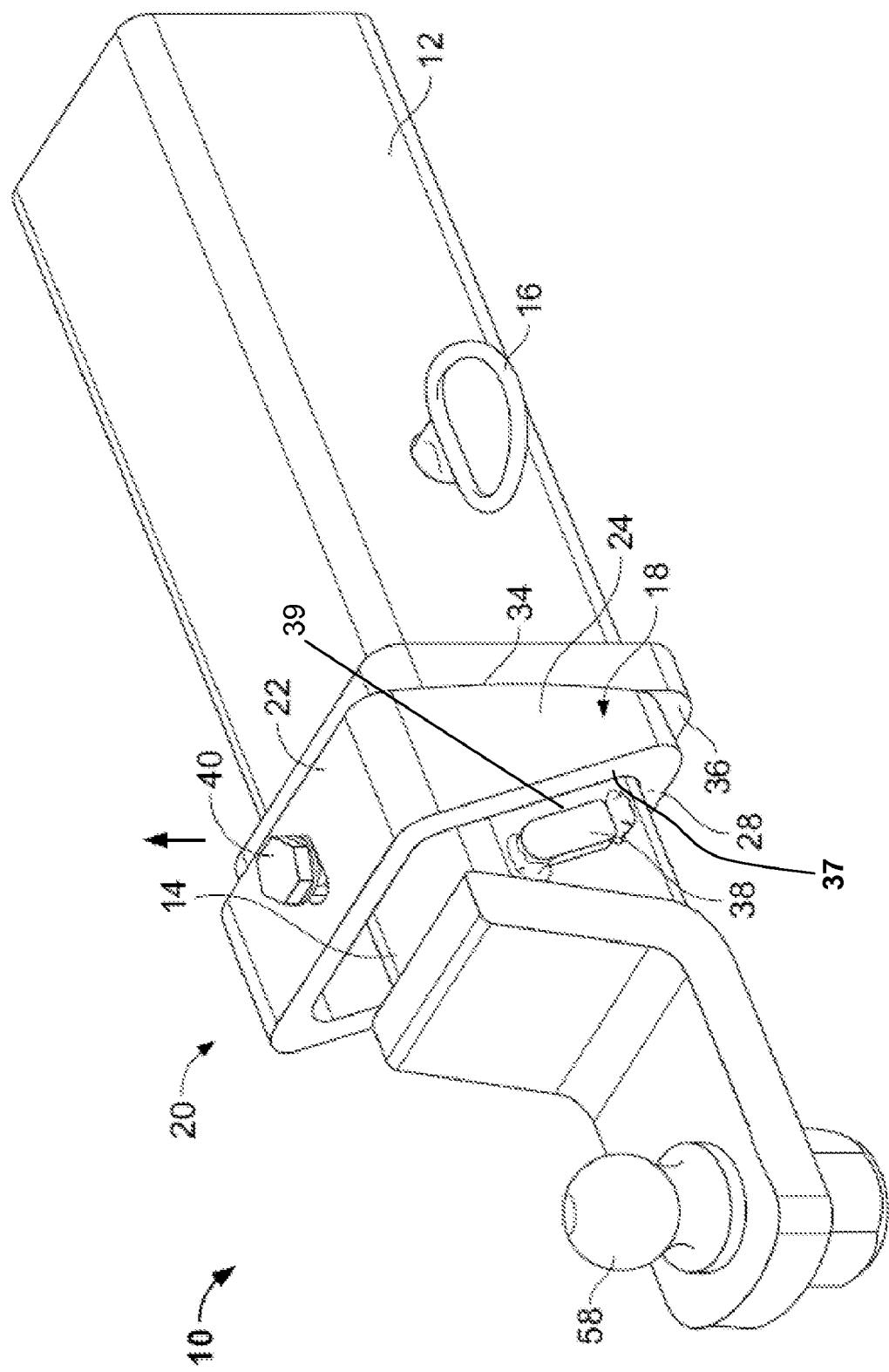
FIG. 2. is a perspective view of the hitch bar assembly of FIG. 1, depicting a wedge member in a disengaged position.

The engagement device 20 includes a bolt 40 that extends through the first and second holes 30, 32 and couples to a captured nut 42. As best seen in FIG. 3, tightening the bolt presses the wedge member into the engaged position. The engagement device further includes a biasing member, spring 44, disposed about the bolt, between the upper wall 22 of the wedge member and the hitch shank 12, proximate to the first and second holes. The engagement device further includes washers 46, 48, 50 disposed between the various components. The spring 44 biases wedge member to a disengaged position, as shown in FIG. 2. In other embodiments, various other locking mechanisms can be used, such as a cam lock. Thus, when user loosens the bolt 40, the wedge member will be urged to the disengaged position. In the disengaged position, the locking pin 16 bears little load, enabling relatively easy removal of the locking pin from the hitch shank 14 and the receiver tube 12.

In the exemplary embodiment, the hitch bar assembly 10 further includes an L-shaped ball mount 52 attached to the hitch shank 14. The ball mount defines a hole 54 sized to receive a threaded shank 56 of a tow ball 58. The threaded shank attaches to a nut 60 below the ball mount to hold the ball mount in place. In other embodiments, the ball mount can assume various other configurations, as suitable for particular uses.

With reference to FIG. 1, the hitch shank 14 defines a pair of apertures 62 that are configured to align with a corresponding pair of apertures 64 defined by the receiver tube 12 such that the locking pin 16 can pass through to couple the hitch shank and the receiver tube together. The locking pin is configured to couple to a cotter pin 66 to keep in place. The locking pin defines an aperture at its distal end sized to receive the cotter pin. In other embodiments, various other locking configurations can be used to couple the hitch shank and the receiver tube together.

It should be appreciated from the foregoing that the present invention provides a hitch bar assembly having a hitch shank configured to be received within an opening of a hitch receiver of a tow vehicle and a wedge member disposed about the hitch shank. The wedge member has first and second surfaces on opposing sides of the wedge member, angled relative to one another. An engagement device is coupled to the wedge member to press the wedge member to an engaged position that causes the hitch shank to bias away from the receiver tube to minimize play therebetween.

Although the invention has been disclosed in detail with reference only to the exemplary embodiments, those skilled in the art will appreciate that various other embodiments can be provided without departing from the scope of the invention, to include any and all combination of features discussed herein. Accordingly, the invention is defined only by the claims set forth below.

What is claimed is:

1. A hitch bar assembly, comprising:
    a hitch shank configured to be received axially within an opening of a hitch receiver of a tow vehicle;
    a wedge member disposed about the hitch shank, the wedge member having a first surface angled relative to a second surface, the first and second surfaces on opposing sides of the wedge member; and
    an engagement device coupled to the wedge member, the engagement device configured to press the wedge member to an engaged position that causes the hitch shank to bias away from the receiver tube to minimize play therebetween; wherein the wedge member is generally tubular and defines a first hole in an upper portion thereof aligned with a second hole defined by the hitch shank, such that the first and the second hole cooperate to allow the engagement device to pass through to couple the wedge member and the hitch shank together.

2. A hitch bar assembly as defined in claim 1, further comprising an L-shaped ball mount attached to the hitch shank that defines a hole sized to receive a threaded shank of a tow ball.

3. A hitch bar assembly as defined in claim 1, further comprising a support surface that interfaces with the second surface of the wedge member, with the wedge member in an engaged position.

4. A hitch bar assembly as defined in claim 1, wherein the engagement device attaches the wedge member to the hitch shank.

5. A hitch bar assembly as defined in claim 4, wherein the engagement device includes a biasing member that bias wedge member to a disengaged position.

6. A hitch bar assembly, comprising:
    a hitch shank configured to be received within an opening of a hitch receiver of a tow vehicle, the hitch shank having an aperture aligned with a corresponding aperture of the hitch receiver such that a locking pin can pass through the apertures of the hitch shank and the hitch receiver;
    a support surface coupled to the hitch shank, the support surface spaced apart from and facing an end surface of the receiver tube disposed about the opening thereof;

a wedge member having a generally tubular configuration disposed about the hitch shank, the wedge member having a first surface angled relative to a second surface, the first and second surfaces on opposing sides of the wedge member, the second surface configured to engage the support surface; and an engagement device coupled to the wedge member, the engagement device configured to press the wedge member to an engaged position that causes the hitch shank to bias away from the receiver tube to minimize play therebetween.

7. A hitch bar assembly as defined in claim 6, further comprising an L-shaped ball mount that defines a hole sized to receive a threaded shank of a tow ball.

8. A hitch bar assembly as defined in claim 6, wherein the support surface is provided by a support block.

9. A hitch bar assembly as defined in claim 6, wherein the engagement device attaches the wedge member to the hitch shank.

10. A hitch bar assembly as defined in claim 9, wherein the engagement device includes a biasing member that bias wedge member to a disengaged position.

11. A hitch bar assembly as defined in claim 6, wherein the wedge member defines a first hole in an upper portion thereof aligned with a second hole defined by the hitch shank, such that the first and the second hole cooperate to allow the engagement device to pass through to couple the wedge member and the hitch shank together.

12. A hitch bar assembly as defined in claim 6, wherein the engagement device includes a biasing member disposed between the wedge member and the hitch shank to bias the wedge member to a disengaged position.

13. A hitch bar assembly, comprising:

a hitch shank configured to be received within an opening of a hitch receiver of a tow vehicle, the hitch shank having an aperture aligned with a corresponding aperture of the hitch receiver such that a locking pin can pass through the apertures of the hitch shank and the hitch receiver, the hitch shank having two support blocks disposed on opposing sides of the hitch shank, the support blocks spaced apart from and angled relative to an end surface of the receiver tube disposed about the opening thereof;

a wedge member having a generally tubular configuration disposed about the hitch shank, the wedge member having a proximal surface configured to engage the end surface of the receiver tube and a distal surface configured to engage the support blocks of the hitch shank, wherein the distal surface is angled relative to the proximal surface; and an engagement device coupled to the wedge member, the engagement device configured to cause the wedge member to engage the end surface of the receiver tube and the support surface of the hitch shank to bias the shank away from the receiver tube.

14. A hitch bar assembly as defined in claim 13, further comprising an L-shaped ball mount that defines a hole sized to receive a threaded shank of a tow ball.

15. A hitch bar assembly as defined in claim 13, wherein the engagement device attaches the wedge member to the hitch shank, and the engagement device includes a biasing member that bias wedge member to a disengaged position.

16. A hitch bar assembly as defined in claim 13, wherein the proximal surface of the wedge member is generally parallel to the end surface of the hitch receiver.

17. A hitch bar assembly as defined in claim 13, wherein the wedge member defines a first hole in an upper portion thereof aligned with a second hole defined by the hitch shank, such that the first and the second hole cooperate to allow the engagement device to pass through to couple the wedge member and the hitch shank together.

18. A hitch bar assembly as defined in claim 17, wherein the engagement device includes a biasing member disposed between the wedge member and the hitch shank to bias the wedge member to a disengaged position.

19. A hitch bar assembly as defined in claim 18, wherein proximal surface of the wedge member is generally parallel to the end surface of the hitch receiver.

* * * * *